UNITED STATES PATENT OFFICE.

JOHN H. STEVENS, OF NEWARK, NEW JERSEY, ASSIGNOR TO THE CELLULOID MANUFACTURING COMPANY OF NEW YORK, N. Y.

MANUFACTURE OF COMPOUNDS OF PYROXYLINE OR NITRO-CELLULOSE.

SPECIFICATION forming part of Letters Patent No. 269,343, dated December 19, 1882.

Application filed June 12, 1882. (No specimens.)

*To all whom it may concern:*

Be it known that I, JOHN H. STEVENS, of the city of Newark, in the county of Essex and State of New Jersey, have invented certain new and useful Improvements in the Manufacture of Compounds of Pyroxyline or Nitro-Cellulose, of which improvements the following is a specification.

It is well known that camphor is a solvent of such nitro-cellulose as is used in the manufacture of those compounds to which my invention relates, and the camphor is designated as the "converting agent" because of its action upon the nitro-cellulose. In the best practice this solvent action is restrained or left latent until the camphor has been mechanically mixed with the nitro-cellulose and then developed by liquefying the camphor, such liquefaction being effected by subjecting the mixture of pyroxyline and nitro-cellulose to heat and pressure. To facilitate this development of the converting action it has been usual to add to the compound of camphor and pyroxyline alcohol, wood-naphtha, and various other menstrua which were found suitable for this purpose, and which were almost entirely volatilized or evaporated and lost in the process of treating the compound by heat and pressure in masticating-rolls. Such menstrua are designated technically as "volatile," because thus driven off, while the camphor is designated as "non-volatile," because it is not so driven off, during the treatment, but remains very largely in the finished product.

It was the object of my invention to discover new substitutes or equivalents for the menstrua heretofore employed in conjunction with the camphor in such compounds, and by experiments to this end I have discovered that the following new menstrua are efficient for this use—that is to say: acetone, acetate of ethyl, acetate of methyl, fusel-oil, (amylic alcohol,) oil of chamomile, oil of fennel-seed, oil of palmarosa, and oil of worm-seed, or mixture of any of these new menstrua, and such uses of these new menstrua are the subject of the claim hereinafter stated.

In making compounds of pyroxyline with these new menstrua the best practice will be to reduce the pyroxyline to pulp, and at the same time grind up and thoroughly intermix with it the camphor, and any coloring-matters or pigments and other inert matters that may be desired, and afterward add the menstruum to the compound in a vessel, which is then tightly closed, and in which the compound is left for, say, twelve hours, at the end of which time it is ready to be worked in open heated rolls, in the usual manner, the resulting product being a plastic compound of pyroxyline susceptible of being remolded into shapes as desired by heat and pressure, as is well understood.

The following proportions of ingredients will give good results, to wit: soluble pyroxyline or nitro-cellulose, ten parts, by weight; camphor, six parts, by weight; coloring-matter as required; and any one of the above-specified new menstrua, or mixtures of any of them, six to eight parts, by weight, (more or less,) according to the greater or less volatility of the new menstruum or menstrua selected.

It may be added that the foregoing new menstrua are not only efficient in themselves when added to the camphor and nitro-cellulose, but are respectively harmonious in their action when mixed with ethylic or methylic alcohol if it should be deemed expedient to use such alcohols in the compound.

Having thus described the nature and object of my improvements, what I claim herein as new, and desire to secure by Letters Patent, is—

As an improvement in the art of manufacturing compounds of pyroxyline or nitro-cellulose, the use of the hereinbefore-specified new menstrua, in conjunction with camphor, substantially as described.

JOHN H. STEVENS.

Witnesses:
W. L. BRICE,
ABRAHAM MANNERS.